United States Patent
Wang et al.

(10) Patent No.: US 9,634,914 B2
(45) Date of Patent: Apr. 25, 2017

(54) TERAHERTZ WIRELESS COMMUNICATIONS-BASED PEER-TO-PEER COMMUNICATIONS METHODS AND SYSTEMS

(71) Applicant: HUIZHOU TCL MOBILE COMMUNICATION CO., LTD, Huizhou (CN)

(72) Inventors: Kailong Wang, Huizhou (CN); Xianglai Li, Huizhou (CN); Qi Ge, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 86 days.

(21) Appl. No.: 14/369,489

(22) PCT Filed: Feb. 28, 2013

(86) PCT No.: PCT/CN2013/071986
§ 371 (c)(1),
(2) Date: Jun. 27, 2014

(87) PCT Pub. No.: WO2013/155900
PCT Pub. Date: Oct. 24, 2013

(65) Prior Publication Data
US 2015/0003257 A1    Jan. 1, 2015

(30) Foreign Application Priority Data
Apr. 20, 2012  (CN) ........................ 2012 1 0117175

(51) Int. Cl.
*H04L 12/26*    (2006.01)
*H04B 17/23*    (2015.01)
(Continued)

(52) U.S. Cl.
CPC .......... *H04L 43/045* (2013.01); *H04B 17/23* (2015.01); *H04N 7/141* (2013.01); *H04N 7/148* (2013.01); *H04N 7/20* (2013.01); *H04W 76/023* (2013.01)

(58) Field of Classification Search
CPC ....... H04L 29/06; H04L 43/045; H04L 67/36; H04L 41/18; H04N 21/63; H04N 21/632;
(Continued)

(56) References Cited

U.S. PATENT DOCUMENTS 7,835,331 B2 * 11/2010 Dickerson ........ G08B 13/19656
  348/143
8,085,199 B2 * 12/2011 Grau Besoli .......... H04B 7/084
  342/373
(Continued)

FOREIGN PATENT DOCUMENTS

| CN | 101035270 A | 9/2007 |
| CN | 101106503 A | 1/2008 |
| CN | 101170679 A | 4/2008 |

*Primary Examiner* — Brian O'Connor
(74) *Attorney, Agent, or Firm* — Shimokaji IP

(57) ABSTRACT

Terahertz wireless communications-based peer-to-peer communications methods and systems are provided. A system may comprise at least two monitoring nodes. A monitoring node may include a terahertz transceiver for transmitting and receiving monitoring data and connection request information. A monitoring node may be connected to a control module for use in controlling the monitoring node. A monitoring node may be connected to a terahertz transceiver. The system may provide increased transmission capacity, improved directionality of wireless communications, and peer communications between monitoring nodes.

19 Claims, 6 Drawing Sheets

(51) Int. Cl.
*H04N 7/14* (2006.01)
*H04N 7/20* (2006.01)
*H04W 76/02* (2009.01)

(58) Field of Classification Search
CPC .. H04N 21/633; H04N 21/637; H04N 21/647; H04N 7/18; H04N 7/20; H04N 7/141; H04N 7/148; H04N 2005/4426; H04N 21/42221; H04N 7/181; H04B 17/23; H04M 11/00; H04W 76/024; H04W 72/048; H04W 84/18; H04W 64/00; H04W 88/04; G08B 13/19654; G08B 13/19656; G08B 13/1966
See application file for complete search history.

(56) References Cited

U.S. PATENT DOCUMENTS

| | | | | |
|---|---|---|---|---|
| 8,583,044 B2* | 11/2013 | Dua | | G06F 17/30058 340/10.51 |
| 8,588,805 B2* | 11/2013 | Grau Besoli | | H04B 7/084 455/276.1 |
| 8,624,978 B2* | 1/2014 | Miyamaki | | H04N 1/00286 340/540 |
| 8,856,851 B2* | 10/2014 | Davis | | G08C 23/04 709/204 |
| 9,179,104 B2* | 11/2015 | Fan | | H04N 7/181 |
| 9,282,297 B2* | 3/2016 | Siann | | H04N 7/183 |
| 2006/0171453 A1* | 8/2006 | Rohlfing | | G08B 13/19632 375/240.01 |
| 2006/0176834 A1* | 8/2006 | Dickerson | | G08B 13/19656 370/260 |
| 2007/0076094 A1* | 4/2007 | Dickerson | | G08B 13/19645 348/143 |
| 2009/0225164 A1* | 9/2009 | Renkis | | G08B 13/19656 348/143 |
| 2010/0162335 A1* | 6/2010 | Davis | | G08C 23/04 725/110 |
| 2011/0013018 A1 | 1/2011 | Leblond | | |
| 2012/0001802 A1* | 1/2012 | Grau Besoli | | H04B 7/084 342/373 |
| 2012/0257051 A1* | 10/2012 | Cheng | | H04N 7/18 348/143 |
| 2013/0072116 A1* | 3/2013 | Song | | H04B 7/26 455/41.1 |
| 2013/0243436 A1* | 9/2013 | Kargl | | H04B 10/1143 398/115 |
| 2014/0030983 A1* | 1/2014 | Grau Besoli | | H04B 7/084 455/67.11 |
| 2016/0073060 A1* | 3/2016 | Renkis | | G08B 13/19641 348/143 |

* cited by examiner

TERAHERTZ WIRELESS COMMUNICATIONS-BASED PEER-TO-PEER COMMUNICATIONS METHODS AND SYSTEMS

TECHNICAL FIELD

The present disclosure relates to monitoring methods and systems, and in particular to terahertz wireless communications-based peer-monitoring methods and a systems.

BACKGROUND

Traditional wireless transmission systems include analog microwave melee transmission systems, digital microwave transmission systems, 3G wireless network systems and the like. Traditional wireless transmission systems include monitoring devices, often referred to as monitoring nodes. The monitoring nodes often integrate functions such as image capturing and video displaying. The monitoring nodes may include a display device, a camera and the like. While analog microwave transmission-based monitoring systems have less time delay and loss in related signal transmissions, an allowable number of monitoring nodes and relay nodes is limited. While digital microwave video transmission-based monitoring systems and 3G wireless network-based monitoring systems may accommodate a higher number of monitoring nodes, band widths of associated uplink channels and a downlink channels are limited, and peer-to-peer communications between the monitoring nodes cannot be implemented.

Therefore, wireless communication systems are needed that provide peer-to-peer communications between monitoring nodes, low signal transmission delay and loss, and accommodate a high number of monitoring nodes.

SUMMARY

The present disclosure provides terahertz wireless communications-based peer-monitoring methods and systems that implement peer-to-peer communications between monitoring nodes, that include increased transmission capacity and that include improved directionality.

A terahertz wireless communications-based peer-to-peer communication method may include acquiring, by at least two monitoring nodes, respective monitoring data, wherein each monitoring node may include a unique self address and a terahertz transceiver for transmitting and receiving terahertz signals. The method may also include transmitting, by a first monitoring node, a connection request to at least one other monitoring node using terahertz signals. The method may further include answering, by the at least one other monitoring node, after receiving the connection request and establishing a connection with the first monitoring node and transmitting, by the at least one other monitoring node, respective monitoring data to the first monitoring node. The method may further include displaying, using a display device of the first monitoring node, the respective monitoring data transmitted by the at least one other monitoring node.

In another embodiment, a terahertz wireless communications-based peer-to-peer communications method may include acquiring, by at least two monitoring nodes, respective monitoring data, wherein each monitoring node may include a terahertz transceiver for transmitting and receiving terahertz signals. The method may also include transmitting, by a first monitoring node, a connection request to at least one other monitoring node using terahertz signals. The method may further include answering, by the other monitoring node, after receiving the connection request and establishing a connection and transmitting, by the other monitoring node respective monitoring data to the first monitoring node. The methods may also include receiving and displaying, by a display device of the first monitoring node, the respective monitoring data.

In a further embodiment, a terahertz wireless communications-based peer-to-peer communication system may include at least two monitoring nodes for use in acquiring respective monitoring data. Each monitoring node may include a terahertz transceiver for transmitting and receiving monitoring data and connection request information. The system may further include a control module for controlling the monitoring node and the terahertz transceiver.

Terahertz wireless communications-based peer-to-peer communications methods and systems of the present disclosure, may include monitoring nodes that may include a terahertz transceiver for transmitting and receiving respective monitoring data and connection request information, such that a first monitoring node may be communicatively connected to at least one other monitoring node.

FIG. 1 depicts a schematic of a terahertz wireless communications-based peer-to-peer communications system. Monitoring data of any one or multiple monitoring nodes may be acquired from any other monitoring node. Use of terahertz transmission manner, the transmission capacity of the wireless communications is increased, the directionality of the wireless communications is improved, and the peer communications and dynamic networking of the monitoring nodes are better and more sufficiently implemented, thus bringing a fire-new business mode for the field of wireless monitoring.

DETAILED DESCRIPTION

Terahertz wireless communications-based peer-to-peer communications monitoring methods and systems are disclosed. To assist in clarifying the objectives, technical solution and effects of the methods and systems, details of the methods and systems are described with reference to the drawings and example embodiments. It should be understood that the specific embodiments described herein are for illustrative purposes and are not intended to limit the scope of the present invention.

Figure 1:
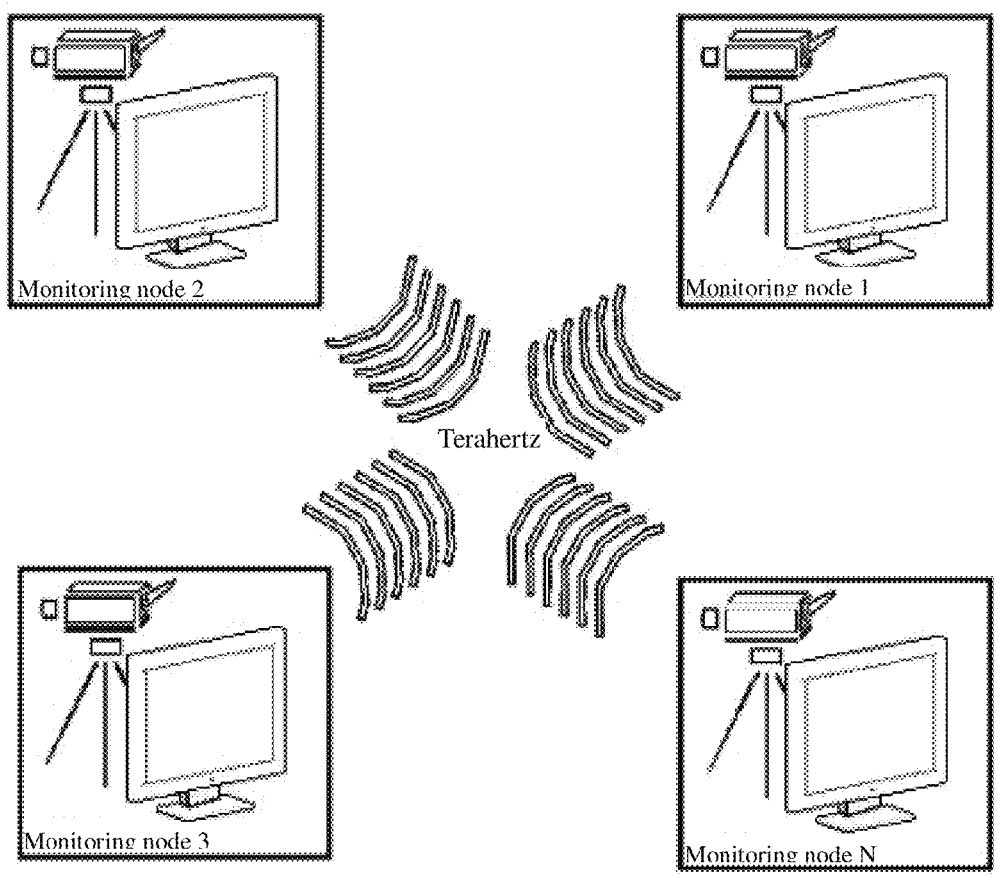
FIG. 1 depicts an example effect schematic view of a terahertz wireless communications-based peer-to-peer communications system.
Figure 2:
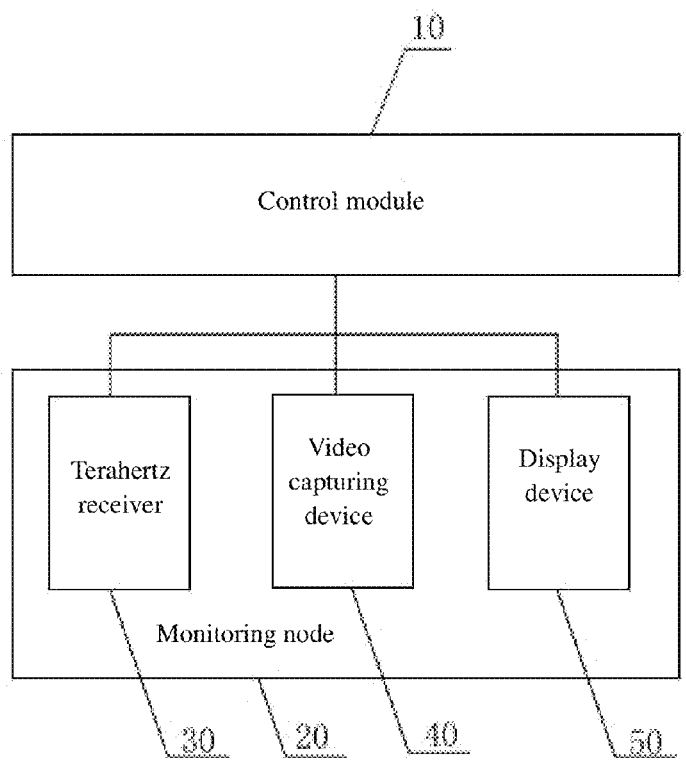
FIG. 2 depicts an example principle schematic view of the terahertz wireless communications-based peer-to-peer communications system.

Turning to FIG. 2 an example schematic of a terahertz wireless communications-based peer-to-peer communications system is depicted. A terahertz wireless communications-based peer-to-peer communications system may comprise at least two monitoring nodes 20 for acquiring respective monitoring data. Each monitoring node 20 may include a terahertz transceiver 30. The terahertz transceiver 30 may be used for transmitting and receiving monitoring data and connection request information, establishing a positioning connection between a monitoring node that transmits a connection request and at least one another monitoring node through requesting and answering, and transmitting and receiving the monitoring data through terahertz signals. For example, each monitoring node may broadcast a self address to other monitoring node(s) using a terahertz transceiver 30 and read the positional information and monitoring data of the other monitoring node(s). A monitoring node 20 may include a video capturing device 40 and/or an audio capturing device for use in acquiring monitoring data. In one embodiment, monitoring node 20 only includes a video capturing device 40. A monitoring node may include a display device 50 for use in displaying monitoring data. A monitoring node 20 may be connected to a control module 10. A control module 10 may be used in controlling a monitoring node 20. A terahertz transceiver 30, a video capturing device 40 and a display device 50 may all be connected to a control module 10. A user may read monitoring data of any one or multiple monitoring nodes at each monitoring node 20 through a control module 10.

For example, a monitoring node may acquire respective monitoring data and process the respective monitoring data into a data packet applicable for terahertz transmission and may transmit the data packet to another monitoring node that transmits a connection request using terahertz signals. The monitoring node that transmits the connection request may, after receiving the data packet, process the data packet as a playable multimedia stream and may then play the multimedia stream.

Figure 3:
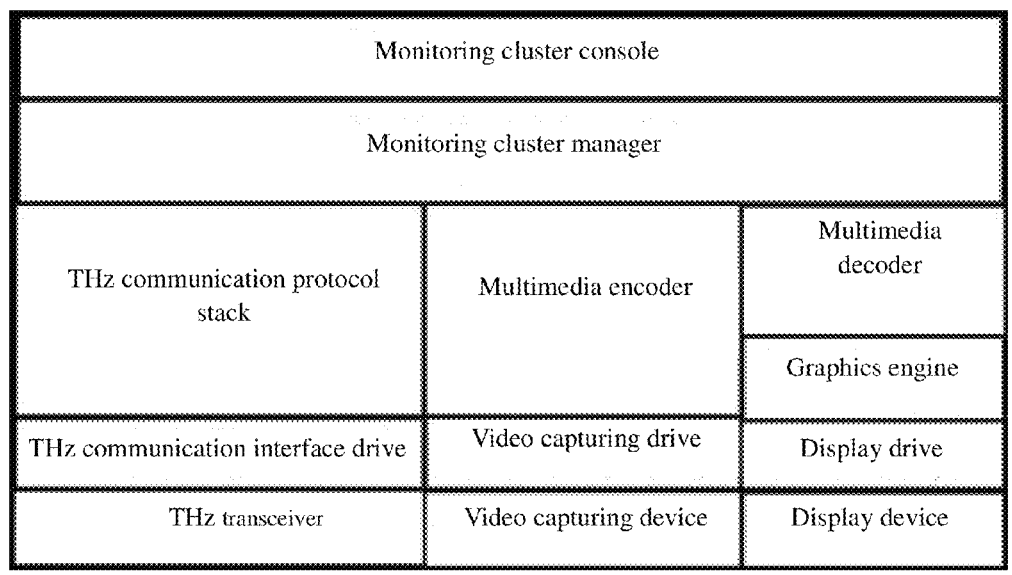
FIG. 3 depicts an example software schematic diagram of the terahertz wireless communications-based peer-to-peer communications system.

With reference to FIG. 3, a software schematic diagram of an example terahertz wireless communications-based peer-to-peer communications system is depicted. A hardware unit may be arranged at a bottom layer, comprising a terahertz transceiver, a video capturing device and a display device. A terahertz transceiver may be used for receiving and transmitting terahertz wireless signals that may carry a monitoring data stream. A video capturing device may be a camera.

Logical functions, implemented in software, may be stored on a hardware unit. A terahertz communication interface drive may be used for controlling a terahertz transceiver to receive and transmit monitoring data. A terahertz communication protocol stack may be used for data processing of such protocol layers as handshake, retransmission, packet disassembly and packet recombination. A video capturing device and/or a display device may include corresponding driver software. A video capturing device may correspond to a video capturing drive. A display device may correspond to a display drive. A multimedia encoder may be arranged above a video capturing drive within respective protocol layers. A multimedia encoder may be used for acquiring monitoring frames in real time, compressing monitoring frames into corresponding medium formats, and transmitting monitoring frames to other monitoring nodes. A graphics engine and/or a multimedia decoder may be arranged above the display drive within respective protocol layers. An original graph frame may be obtained by decoding a monitoring stream received by a monitoring node, and may be presented on a display device by a graphics engine in a single menu or multi-menu manner.

A control module may include a monitoring cluster console and/or a monitoring cluster manager. A monitoring cluster manager may be used for increasing or decreasing a number of monitoring nodes, as well as, for controlling associated transmitting and receiving of monitoring data. Related functions of a monitoring cluster manager may include requesting and answering for increasing or decreasing a number of monitoring nodes, requesting and answering for connecting of monitoring nodes, as well as, transmitting and receiving monitoring data. A monitoring cluster console may be located on top layer of the protocol layers. A monitoring cluster console may allow a user to control behaviors of a monitoring node via a graphical interface or command line. Behaviors may comprise: appointing a monitoring node, adjusting a multi-menu display effect, controlling a camera holder, and the like Implementation of software for a control module, a terahertz transceiver, a video capturing device and/or a display device are all known to those skilled in the art, so that the specific software implementation principles are not described at length herein.

Figure 4:
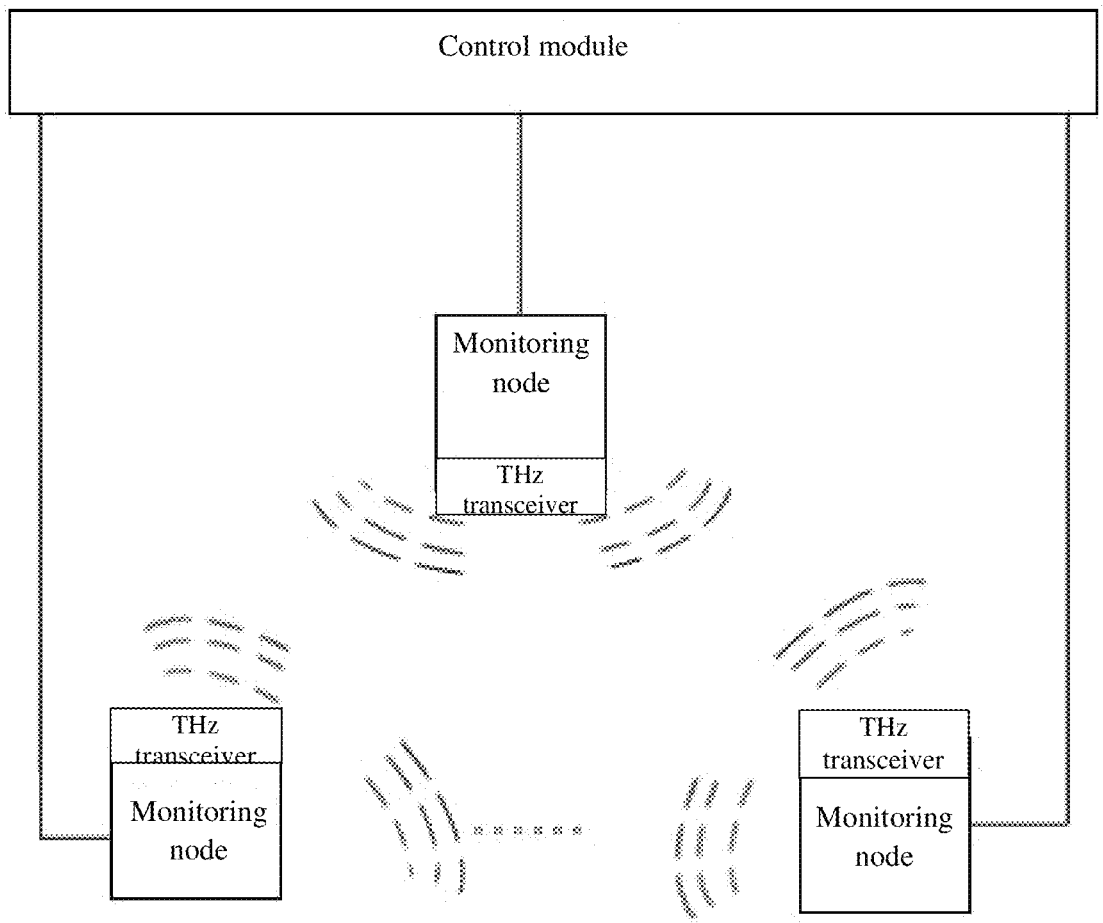
FIG. 4 depicts an example schematic view of a terahertz wireless communications-based peer-to-peer communications system.

Turning to FIG. 4 a schematic of a terahertz wireless communications-based peer-to-peer communications system is depicted. All the monitoring nodes may share one control module and general control may be carried out on all the monitoring nodes, so as to reduce associated costs. For example, each monitoring node may be connected to a common control module. In this way, the user may either control the active state of each monitoring node such as closing or opening, or locking a certain monitoring node. Because a terahertz transceiver of each monitoring node may transmit and receive monitoring data of other monitoring nodes, a user may also read monitoring data of any monitoring node on each monitoring node.

Figure 5:
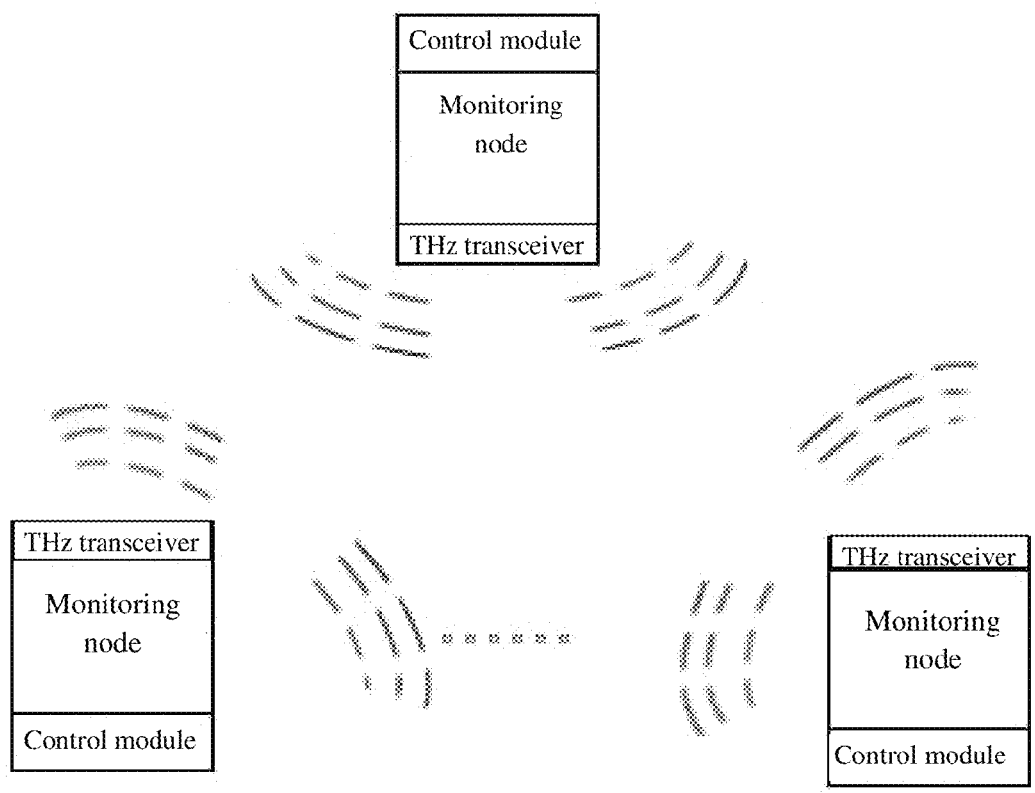
FIG. 5 depicts an example schematic view of a terahertz wireless communications-based peer-to-peer communications system.

Alternatively, each monitoring node may be provided with a respective control module. As shown in FIG. 5, each control module may be connected to one monitoring node and one terahertz transceiver. Thus, each monitoring node may independently implement wireless communications. Furthermore, each monitoring node may be both completely independent and be mutually connected.

A number of the monitoring nodes may be freely increased and decreased. Positioning of each monitoring node may be implemented by setting an address so that the monitoring nodes can be mutually recognized. Any two monitoring nodes may transmit and receive a connection request using terahertz signals. When monitoring data of a certain monitoring node is required, the respective monitoring node only needs to search the self address of the corresponding monitoring node, and transmitting or receiving monitoring data may be carried out.

Figure 6:
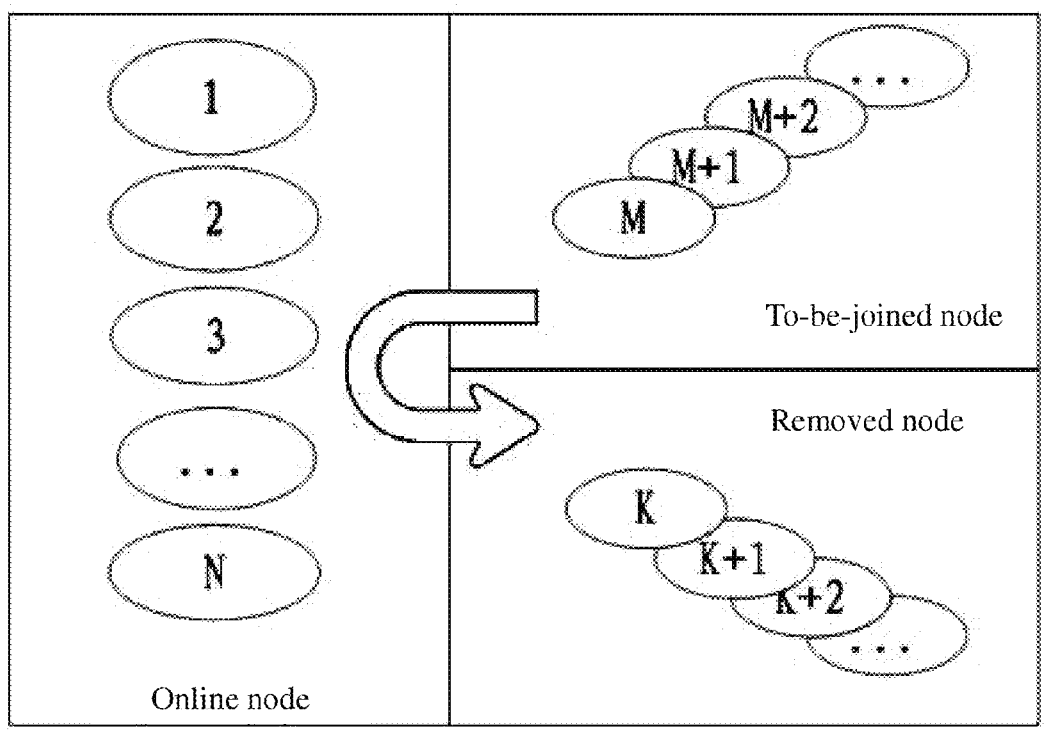
FIG. 6 depicts an example state schematic view of a monitoring node in a terahertz wireless communications-based peer-to-peer communications system.

With reference now to FIG. 6, a state schematic of a monitoring node, (hereafter referred to as "node") in a terahertz wireless communications-based peer-to-peer communications system is depicted. The left side of the state schematic refers to online node (1, 2, 3 . . . N), which may belong to active nodes. The right side of the state schematic refers to to-be-joined nodes (M, M+1, M+2, . . . ) and removed nodes (K, K+1, K+2, . . . ), which belong to non-active nodes. A monitoring node cannot become an online node until going through a registration flow. Monitoring menus of active nodes can viewed freely. If one node does not need to exist, the node may be removed as a non-active node. A working flow of a node may comprise the following three steps.

I. Increase nodes. Full address scanning may be carried out on a specific subnet by the to-be-joined node through a broadcasting (terahertz transceiver) manner. Other nodes after receiving a scanning signal respond until an unresponsive address is encountered, wherein the unresponsive address is used as a self address. Thus, all the monitoring nodes have a unique self address for positioning and connecting conveniently, and accurately transmitting a connection request. Moreover, the newly joined node may notify newly acquired address thereof to other active nodes. An address may be similar to an IP address of the internet. Label information, such as detailed corridor position, may be increased for each node manually or automatically.

II. Request services. After a node is in an active state, if a menu monitoring request is transmit to any one effective address, a monitoring data stream may be received after answering interaction. For example, a node may receive monitoring data of a plurality of nodes at the same time, and present the monitoring data on a display device in a multi-menu manner.

III. Delete a node. When a node does not need to exist, a broadcasting command of quitting a monitoring cluster network may be transmitted, and other nodes, after receiving the command, may consider the node unavailable. In order to handle the situation of abnormal offline, each node may also periodically transmit a broadcast for use in "heart beat" maintenance. If a broadcast of a certain node cannot be received after a plurality of periods, the node will also be considered to be in a removed state.

A peer-to-peer network may be formed by a plurality of nodes, and the nodes may communicate through terahertz signals. Because of high speed data stream of the terahertz, each node may view captured menus of other nodes in real time with high resolution. Moreover, viewing a plurality of nodes at the same time through a multi-menu split-screen manner is supported. The nodes may be in a completely peer point-to-point relationship. A number of nodes may be dynamically increased and decreased. Therefore, the flexibility and reliability of monitoring deployment are greatly increased.

In terahertz wireless communications-based peer-to-peer communications system, each monitoring node may either be provided with a display device, or only provided with an interface for use in being connected to a display device. In this way, when a user needs to view monitoring data of any monitoring node, the user can connect a display device on the interface of one monitoring node, so that the cost and the installation space are saved.

Figure 7:
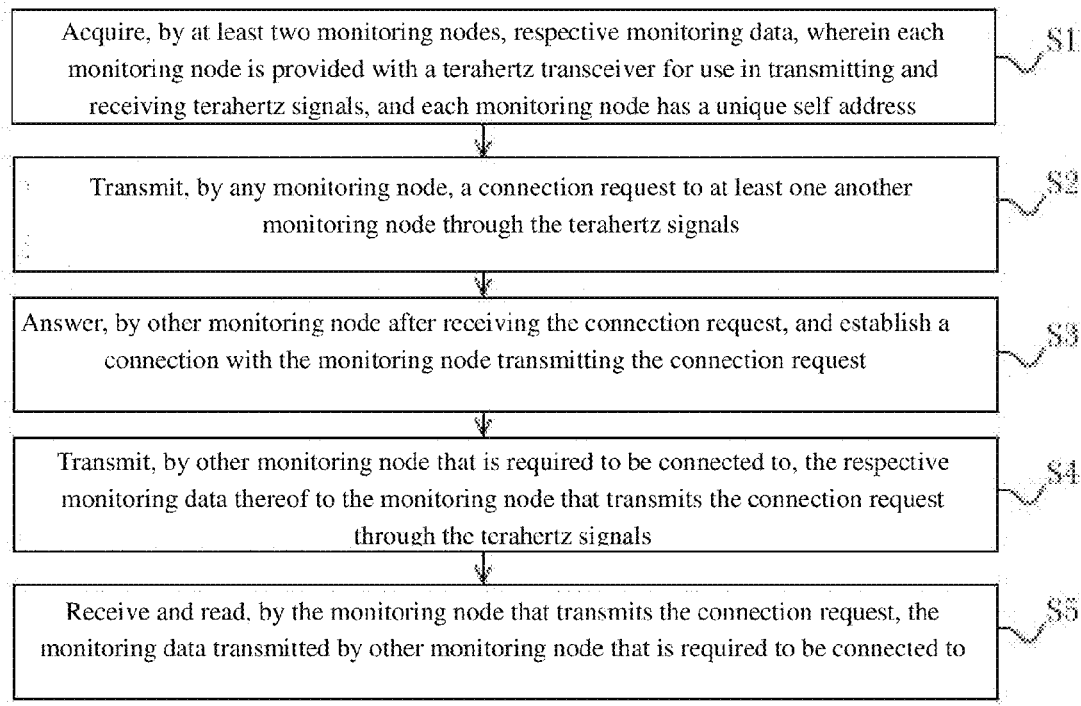
FIG. 7 depicts an example schematic view of a terahertz wireless communications-based peer-to-peer communications method.

A terahertz wireless communications-based peer-to-peer communications is depicted in FIG. 7. A terahertz wireless communications-based peer-to-peer communications method may comprise the following steps of:

Step S1: acquiring, by at least two monitoring nodes, respective monitoring data, wherein each monitoring node includes a terahertz transceiver for transmitting and receiving terahertz signals. Each monitoring node may, for example, comprise a terahertz transceiver, a video capturing device and a display device. The video capturing device may be used to acquire monitoring data of a video, and may also comprise monitoring data of an audio. A display device may be used to display monitoring data of a current monitoring node. A terahertz transceiver may be used to process monitoring data into a data packet that may implement terahertz transmission. For convenient positioning and connection, each monitoring node may have a unique self address which may be similar to an IP address of the internet.

Step S2: transmitting, by a first monitoring node, a connection request to at least one other monitoring node using terahertz signals. Specifically, content of a connection request may comprise a self address of the at least one other monitoring node.

Step S3: answering, by the at least one other monitoring node, after receiving the connection request and establishing a connection with the first monitoring node. For details refer to the foregoing descriptions on the working flow of the nodes.

Step S4: transmitting, by the at least one other monitoring node, respective monitoring data to the first monitoring node.

Specifically, the at least one other monitoring node, may processes the respective monitoring data into a data packet suitable for terahertz signal transmission and may transmit the data packet to the first monitoring node.

Step S5: receiving and displaying, by a display device of the first monitoring node, the monitoring data transmitted by the at least one other monitoring node. Because the general monitoring data may be video information, the monitoring node that transmits the connection request may read the monitoring data of the at least one other monitoring node.

Monitoring data, when being transmitted through terahertz signals, may require early stage processing. Specifically, a monitoring node that transmits the connection request, after receiving the data packet, may process the data packet into monitoring data suitable for displaying, for example, the monitoring node may process the data packet into a playable multimedia stream and may play the multimedia stream.

A monitoring node that transmits a connection request, may read monitoring data transmitted by other monitoring nodes. For example, the monitoring data may be read on a display device.

Reading monitoring data of any other one or multiple monitoring nodes may be implemented through the method of the present disclosure. That is, peer-to-peer communications may be implemented, which solves the restrictions of traditional monitoring methods. Moreover, an interface for use in being connected to a display device may be arranged on each monitoring node without needing to arrange one display device for each monitoring node independently. When a user needs to monitor at a particular position, the user may directly connect one display device to an interface to view the monitoring data of any monitoring node, which greatly increases the monitoring efficiency and saves cost.

Terahertz wireless communications-based peer-to-peer communications methods and systems of the present disclosure may be implemented based on terahertz. Wireless monitoring using terahertz breaks out the restriction of other wireless communications manners, and may implement flexible cluster monitoring based on ensuring the monitoring menu quality and time delay. In addition, the parity between monitoring nodes may be implemented, so that the monitoring nodes can be dynamically increased and decreased and serve as a monitoring service platform, so that each monitoring node may be endowed with safer networking performance and intellectuality.

It should be understood that a person having ordinary skill in the art may improve or transform the embodiments according to the foregoing descriptions. All improvements and transformations of the embodiments shall fall within the protection scope of the claims of the present invention.

We claim:

1. A terahertz wireless communications-based peer-to-peer communication method, comprising the following steps:
   acquiring, by at least two monitoring nodes, respective monitoring data, wherein each monitoring node includes a unique self address and a terahertz transceiver for transmitting and receiving terahertz signals;
   wherein the unique self address is acquired by full address scanning a specific subnet until an unresponsive address is encountered;
   transmitting, by a first monitoring node, a connection request directly to at least one other monitoring node by broadcasting using terahertz signals, without going through a third device;
   answering, by the at least one other monitoring node, after receiving the connection request and establishing a connection with the first monitoring node, the connection request;
   transmitting, by the at least one other monitoring node, respective monitoring data to the first monitoring node by broadcasting; and
   displaying, using a display device of the first monitoring node, the respective monitoring data transmitted by the at least one other monitoring node wherein the terahertz transceiver of each monitoring node is configured to transmit and receive monitoring data of another monitoring node of the at least two monitoring nodes.

2. The terahertz wireless communications-based peer-to-peer communication method according to claim 1, wherein a content of the connection request comprises the self address of the at least one other monitoring node.

3. The terahertz wireless communications-based peer-to-peer communication method according to claim 1, wherein transmitting the respective monitoring data comprises:
   processing, by the at least one other monitoring node, the respective monitoring data into a data packet suitable for terahertz signal transmission and transmitting the data packet to the first monitoring node.

4. The terahertz wireless communications-based peer-to-peer communication method according to claim 3, wherein displaying the respective monitoring data further comprises:
   processing, by the first monitoring node, the data packet into monitoring data suitable for displaying after receiving the data packet; and
   displaying by the display device of the first monitoring node, the respective monitoring data transmitted by the at least one other monitoring node.

5. The terahertz wireless communications-based peer-to-peer communication method according to claim 1, wherein the respective monitoring data comprises audio data.

6. The terahertz wireless communications-based peer-to-peer communication method according to claim 1, wherein the respective monitoring data comprises video data.

7. A terahertz wireless communications-based peer-to-peer communication method, comprising the following steps:
   acquiring, by at least two monitoring nodes each with a video capturing device to acquire respective monitoring data, wherein each monitoring node is provided with a terahertz transceiver for transmitting and receiving terahertz signals;
   wherein each of the at least two monitoring nodes acquires a unique self address by full address scanning a specific subnet until an unresponsive address is encountered;
   transmitting, by a first monitoring node, a connection request directly to at least one other monitoring node using terahertz signals without going through a third device;
   answering, by the at least one other monitoring node, after receiving the connection request and establishing a connection with the monitoring node;
   transmitting, by the at least one other monitoring node, respective monitoring data to the first monitoring node; and
   receiving, by the first monitoring node, the respective monitoring data transmitted by the at least one other monitoring node,
   wherein the at least two monitoring nodes comprise independent wireless communication and are mutually connected to one another.

8. The terahertz wireless communications-based peer-to-peer communication method according to claim 7, wherein a content of the connection request comprises the self address of the at least one other monitoring node.

9. The terahertz wireless communications-based peer-to-peer communication method according to claim 7, wherein transmitting the respective monitoring data comprises:
   processing, by the at least one other monitoring node, the respective monitoring data into a data packet suitable for terahertz signal transmission and transmitting the data packet to the first monitoring node.

10. The terahertz wireless communications-based peer-to-peer communication method according to claim 9, wherein receiving the respective monitoring data further comprises:
    processing, by the first monitoring node, the data packet into monitoring data suitable for displaying after receiving the data packet; and
    displaying, by a display device of the first monitoring node, the monitoring data.

11. The terahertz wireless communications-based peer-to-peer communication method according to claim 7, wherein the monitoring data comprises audio data.

12. The terahertz wireless communications-based peer-to-peer communication method according to claim 7, wherein the monitoring data comprises video data.

13. The terahertz wireless communications-based peer-to-peer communication method according to claim 7, wherein receiving the respective monitoring data further comprises:
    displaying, by a display device of the first monitoring node, the respective monitoring data.

14. A terahertz wireless communications-based peer-to-peer communication system, comprising:
    at least two monitoring nodes for use in acquiring respective monitoring data, wherein each monitoring node includes a terahertz transceiver for transmitting and receiving monitoring data and connection request information directly to other monitoring nodes without going through a third device;
    wherein each of the at least two monitoring nodes acquires a unique self address by full address scanning a specific subnet until an unresponsive address is encountered; and
    a control module connected directly to the at least two monitoring nodes without going through the third device for controlling the at least two monitoring nodes and the terahertz transceivers, wherein the terahertz transceiver of each of the at least two monitoring nodes is configured to transmit and receive monitoring data of another monitoring node of the at least two monitoring nodes.

15. The terahertz wireless communications-based peer-to-peer communication system according to claim 14, wherein a control module is connected to each monitoring node and the respective terahertz transceiver.

16. The terahertz wireless communications-based peer-to-peer communication system according to claim 14, wherein each monitoring node is correspondingly connected to one control module for use in controlling the respective monitoring node and the respective terahertz transceiver.

17. The terahertz wireless communications-based peer-to-peer communication system according to claim 14, wherein at least one monitoring node comprises a video capturing device connected to the control module.

18. The terahertz wireless communications-based peer-to-peer communication system according to claim 14, wherein at least one monitoring node comprises an audio capturing device connected to the control module.

19. The terahertz wireless communications-based peer-to-peer communication system according to claim 14, wherein at least one monitoring node comprises a display device for use in displaying the monitoring data.

* * * * *